United States Patent
Hahn et al.

(10) Patent No.: US 12,267,169 B2
(45) Date of Patent: Apr. 1, 2025

(54) METHOD AND APPARATUS FOR TRANSMITTING AND RECEIVING HARQ RESPONSE IN COMMUNICATION SYSTEM SUPPORTING SIDELINK COMMUNICATION

(71) Applicants: Hyundai Motor Company, Seoul (KR); Kia Corporation, Seoul (KR)

(72) Inventors: Gene Back Hahn, Gyeonggi-do (KR); Hyuk Min Son, Jeollabuk-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 521 days.

(21) Appl. No.: 17/635,135

(22) PCT Filed: Jul. 16, 2020

(86) PCT No.: PCT/KR2020/009378
§ 371 (c)(1),
(2) Date: Feb. 14, 2022

(87) PCT Pub. No.: WO2021/029547
PCT Pub. Date: Feb. 18, 2021

(65) Prior Publication Data
US 2022/0337348 A1 Oct. 20, 2022

Related U.S. Application Data

(60) Provisional application No. 62/886,610, filed on Aug. 14, 2019.

(30) Foreign Application Priority Data

Jul. 15, 2020 (KR) .................. 10-2020-0087217

(51) Int. Cl.
*H04L 1/1812* (2023.01)
*H04L 5/00* (2006.01)
*H04W 72/20* (2023.01)

(52) U.S. Cl.
CPC .......... *H04L 1/1812* (2013.01); *H04L 5/0055* (2013.01); *H04L 5/0094* (2013.01); *H04W 72/20* (2023.01)

(58) Field of Classification Search
CPC ... H04L 1/1812; H04L 1/1861; H04L 1/1893; H04L 1/1896; H04L 5/0037;
(Continued)

(56) References Cited

U.S. PATENT DOCUMENTS 11,388,733 B2 * 7/2022 Huang .................. H04W 76/27
2020/0228247 A1 * 7/2020 Guo ....................... H04L 5/0048
(Continued)

FOREIGN PATENT DOCUMENTS

CN 109792594 A 5/2019
EP 3902169 B1 * 4/2024 ........... H04B 7/0626
(Continued)

OTHER PUBLICATIONS

Nokia, "Discussion on Sidelink Groupcase HARQ", R1-1905340, 3GPP TSG RAN WG1 Meeting #96bis, Xi' an China, Apr. 3, 2019.
(Continued)

*Primary Examiner* — Chi H Pham
*Assistant Examiner* — Vladislav Y Agureyev
(74) *Attorney, Agent, or Firm* — Fox Rothschild LLP

(57) ABSTRACT

Disclosed are a method and apparatus for transmitting and receiving an HARQ response in a communication system supporting sidelink communication. An operating method for a transmitting terminal comprises the steps of: receiving, from a base station, a higher layer signaling message including PSFCH configuration information; transmitting, to one or more receiving terminals, an SCI including data resource allocation information; transmitting, to the one or more receiving terminals, the data on a PSSCH indicated by the SCI; and performing a monitoring operation on a dedicated
(Continued)

PSFCH resource region indicated by the PSFCH configuration information in order to receive a reception response to the SCI from the one or more receiving terminals. Therefore, the performance of the communication system can be improved.

16 Claims, 9 Drawing Sheets

(58) Field of Classification Search
CPC ... H04L 5/0044; H04L 5/0055; H04L 5/0094; H04W 72/20
See application file for complete search history.

(56) References Cited

U.S. PATENT DOCUMENTS

| | | | |
|---|---|---|---|
| 2020/0304969 A1* | 9/2020 | Basu Mallick | H04L 1/1854 |
| 2020/0322099 A1* | 10/2020 | Park | H04W 72/20 |
| 2020/0351866 A1* | 11/2020 | Park | H04L 1/1864 |
| 2021/0028842 A1* | 1/2021 | Kim | H04B 7/0628 |
| 2021/0084462 A1* | 3/2021 | Hwang | H04L 1/1819 |
| 2021/0099994 A1* | 4/2021 | Park | H04L 1/1861 |
| 2021/0345313 A1* | 11/2021 | Basu Mallick | H04L 1/1825 |
| 2022/0053495 A1* | 2/2022 | Huang | H04W 72/20 |
| 2022/0085923 A1* | 3/2022 | Ye | H04L 1/1854 |
| 2022/0124726 A1* | 4/2022 | Zhao | H04W 72/02 |
| 2022/0217764 A1* | 7/2022 | Yoshioka | H04L 1/1854 |
| 2022/0255680 A1* | 8/2022 | Moon | H04L 5/0055 |
| 2022/0278797 A1* | 9/2022 | Lee | H04W 92/18 |
| 2022/0322324 A1* | 10/2022 | Park | H04L 1/00 |
| 2022/0369291 A1* | 11/2022 | Shibaike | H04L 1/1887 |
| 2022/0394700 A1* | 12/2022 | Ko | H04W 56/0045 |
| 2023/0199728 A1* | 6/2023 | Yoshioka | H04W 76/14 370/329 |
| 2023/0379891 A1 | 11/2023 | Zhao | |

FOREIGN PATENT DOCUMENTS

| | | | |
|---|---|---|---|
| WO | 2019-012041 A1 | 1/2019 | |
| WO | WO-2020210333 A1 * | 10/2020 | H04L 1/1812 |

OTHER PUBLICATIONS

Huawei, "Sidelink Physical Layer Procedures for NR V2X", R1-1906008, 3GPP TSG RAN WG1 Meeting #97, Reno, USA, May 3, 2019.
NEC, "Physical Layer Procedures for NR Sidelink", R1-1906394, 3GPP TSG RAN WG1 Meeting #97, Reno, USA, May 3, 2019.
Huawei, Sidelink Physical Layer Structure for NR V2X, R1-1906007, 3GPP TSG RAN WG1 Meeting #97, Reno, USA, May 3, 2019.
R1-1812618, "Discussion on physical layer procedures in NR V2X", 3GPP TSG RAN1 Meeting #95, Spokane, USA, Nov. 12-16, 2018, 8 pages.
R1-1900484, "Sidelink resource allocation aspects for NR V2X unicast and groupcast communication", 3GPP TSG RAN WG1 Ad-Hoc Meeting 1901, Taipei, Taiwan, Jan. 21-25, 2019, 6 pages.
R1-1905099, "Physical layer structure for NR V2X", 3GPP TSG RAN WG1 #96bis, Xi'an, China, Apr. 8-12, 2019, 9 pages.
R1-1906008, "Sidelink physical layer procedures for NR V2X", 3GPP TSG RAN WG1 Meeting #97, Reno, USA, May 13-17, 2019, Agenda Item 7.2.4.5, 23 pages.

* cited by examiner

METHOD AND APPARATUS FOR TRANSMITTING AND RECEIVING HARQ RESPONSE IN COMMUNICATION SYSTEM SUPPORTING SIDELINK COMMUNICATION

CROSS-REFERENCE TO RELATED APPLICATION

This application is a National Phease application filed under 35 USC 371 of PCT International Application No. PCT/KR2020/009378 with an International Filing Date of Jul. 16, 2020, which claims priority from U.S. Provisional Application No. 62/886,610, filed on Aug. 14, 2019 and Korean Application No. 10-2020-0087217, filed on Jul. 15, 2020. The entire contents of these applications are incorporated herein by reference in their entirety.

BACKGROUND

(a) Technical Field

The present disclosure relates to a sidelink communication technique, more particularly, to a technique for transmitting and receiving a hybrid automatic repeat request (HARQ) response for sidelink communication performed in a groupcast scheme.

(b) Description of the Related Art

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4 G communication system and 5 G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on sidelink communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. Sidelink communication may be performed using configured grant (CG) resources. The CG resources may be periodically configured, and periodic data (e.g., periodic sidelink data) may be transmitted using the CG resources.

Meanwhile, sidelink communication may be performed based on a unicast scheme, a multicast scheme, a groupcast scheme, and/or a broadcast scheme. In addition, a blind retransmission scheme may be supported for retransmission of sidelink data in sidelink communication, and a hybrid automatic repeat request (HARQ) operation may be supported. As a HARQ response (e.g., HARQ feedback) for sidelink data, acknowledgment (ACK) or negative ACK (NACK) may be transmitted.

Alternatively, a NACK-only feedback scheme may be used as a transmission scheme of the HARQ response. In this case, a HARQ response (e.g., ACK) may not be transmitted when the sidelink data has been successfully received, and a HARQ response (e.g., NACK) may be transmitted when the reception of the sidelink data has failed. Here, when reception of sidelink control information (SCI) including scheduling information of the sidelink data fails, since the receiving terminal (e.g., terminal receiving the sidelink data) is not able to detect the sidelink data, the receiving terminal may not be able to transmit a HARQ response.

Since the transmitting terminal that has transmitted the SCI and sidelink data (e.g., terminal transmitting the sidelink data) does not receive the HARQ response from the receiving terminal, it may determine that the sidelink data has been successfully received by the receiving terminal. That is, when the NACK-only feedback scheme is used, the transmitting terminal may determine that the receiving terminal has successfully received the sidelink data even when the reception of the sidelink data has failed. In this case, since the performance of the communication system may be degraded, methods for solving this problem are required.

SUMMARY

An objective of the present disclosure for solving the above-described problem is to provide a method and an apparatus for transmitting and receiving a hybrid automatic repeat request (HARQ) response in a communication system supporting sidelink communication.

An operation method of a transmitting terminal, according to a first exemplary embodiment of the present disclosure for achieving the objective, may comprise: receiving, from a base station, a higher layer signaling message including physical sidelink feedback channel (PSFCH) configuration information; transmitting, to one or more receiving terminals, sidelink control information (SCI) including resource allocation information of data; transmitting, to the one or more receiving terminals, the data on a physical sidelink shared channel (PSSCH) indicated by the SCI; performing a monitoring operation on a dedicated PSFCH resource region indicated by the PSFCH configuration information to receive a reception response for the SCI from the one or more receiving terminals; and performing a monitoring operation on a shared PSFCH resource region indicated by the PSFCH configuration information to receive a hybrid automatic repeat request (HARQ) response for the data from the one or more receiving terminals.

The dedicated PSFCH resource region and the shared PSFCH resource region may be arranged in a same symbol, and the dedicated PSFCH resource region may be multiplexed with the shared PSFCH resource region in frequency domain.

The dedicated PSFCH resource region and the shared PSFCH resource region may be arranged in same frequency resources, and the dedicated PSFCH resource region may be multiplexed with the shared PSFCH resource region in time domain.

The PSFCH configuration information may include information indicating a ratio between a size of the shared PSFCH resource region and a size of the dedicated PSFCH resource region.

The PSFCH configuration information may be configured with a PSFCH format 1 and a PSFCH format 2, the PSFCH format 1 or the PSFCH format 2 may be used according to a number of the one or more receiving terminals, and the PSFCH format 1 and the PSFCH format 2 may indicate the dedicated PSFCH resource region and the shared PSFCH resource region, respectively.

The PSFCH configuration information may be configured with PSFCH configuration information 1 and PSFCH configuration information 2, the PSFCH configuration information 1 may be used when a number of the one or more receiving terminals is less than or equal to a threshold, the PSFCH configuration information 1 and the PSFCH configuration information 2 may be used when the number of the one or more receiving terminals exceeds a threshold, and the PSFCH configuration information 1 and the PSFCH configuration information 2 may indicate the dedicated PSFCH resource region and the shared PSFCH resource region, respectively.

The SCI may further include information indicating the dedicated PSFCH resource region and the shared PSFCH resource region, and the dedicated PSFCH resource region and the shared PSFCH resource region may be configured within a resource range indicated by the PSFCH configuration information.

When the reception response indicates that the SCI has been successfully received, and the HARQ response is not received in the shared PSFCH resource region, it may be determined that the data has been successfully received by the one or more receiving terminals.

When the reception response is not received, it may be determined that reception of the SCI has failed in the one or more reception terminals.

An operation method of a receiving terminal, according to a second exemplary embodiment of the present disclosure for achieving the objective, may comprise: receiving, from a base station, a higher layer signaling message including physical sidelink feedback channel (PSFCH) configuration information; obtaining, from a transmitting terminal, sidelink control information (SCI) including resource allocation information of data; transmitting a reception response for the SCI to the transmitting terminal through a dedicated PSFCH resource region indicated by the PSFCH configuration information; and performing a monitoring operation on a physical sidelink shared channel (PSSCH) indicated by the SCI to obtain the data from the transmitting terminal.

The operation method may further comprise, when reception of the data fails, transmitting a negative acknowledgment (NACK) for the data to the transmitting terminal through a shared PSFCH resource region indicated by the PSFCH configuration information, wherein the shared PSFCH resource region is configured independently of the dedicated PSFCH resource region.

When the dedicated PSFCH resource region and the shared PSFCH resource region are arranged in a same symbol, the dedicated PSFCH resource region may be multiplexed with the shared PSFCH resource region in frequency domain, and when the dedicated PSFCH resource region and the shared PSFCH resource region are arranged in same frequency resources, the dedicated PSFCH resource region may be multiplexed with the shared PSFCH resource region in time domain.

The PSFCH configuration information may include information indicating a ratio between a size of the shared PSFCH resource region and a size of the dedicated PSFCH resource region.

The PSFCH configuration information may be configured with a PSFCH format 1 and a PSFCH format 2, the PSFCH format 1 or the PSFCH format 2 may be used according to a number of the one or more receiving terminals, and a union of the shared PSFCH resource region and the dedicated PSFCH resource region indicated by the PSFCH format 1 may be different from a union of the shared PSFCH resource region and the dedicated PSFCH resource region indicated by the PSFCH format 2.

The PSFCH configuration information may be configured with PSFCH configuration information 1 and PSFCH configuration information 2, the PSFCH configuration information 1 may be used when a number of the one or more receiving terminals is less than or equal to a threshold, the PSFCH configuration information 1 and the PSFCH configuration information 2 may be used when the number of the one or more receiving terminals exceeds a threshold, and the shared PSFCH resource region and the dedicated PSFCH resource region indicated by the PSFCH configuration information 1 may be configured independently of the shared PSFCH resource region and the dedicated PSFCH resource region indicated by the PSFCH configuration information 2.

The SCI may further include information indicating the dedicated PSFCH resource region and the shared PSFCH resource region, and the dedicated PSFCH resource region and the shared PSFCH resource region may be configured within a resource range indicated by the PSFCH configuration information.

An operation method of a base station, according to a second exemplary embodiment of the present disclosure for achieving the objective, may comprise: configuring a dedicated physical sidelink feedback channel (PSFCH) resource region used for transmission and reception of a reception response for sidelink control information (SCI); configuring a shared PSFCH resource region used for transmission and reception of a hybrid automatic repeat request (HARQ) response for data scheduled by the SCI; and transmitting a higher layer signaling message including PSFCH configuration information including configuration information of the dedicated PSFCH resource region and configuration information of the shared PSFCH resource region.

When the dedicated PSFCH resource region and the shared PSFCH resource region are arranged in a same symbol, the dedicated PSFCH resource region may be multiplexed with the shared PSFCH resource region in frequency domain, and when the dedicated PSFCH resource region and the shared PSFCH resource region are arranged in same frequency resources, the dedicated PSFCH resource region may be multiplexed with the shared PSFCH resource region in time domain.

The PSFCH configuration information may be configured with a PSFCH format 1 and a PSFCH format 2, the PSFCH format 1 or the PSFCH format 2 may be used according to a number of the one or more receiving terminals, and a union of the shared PSFCH resource region and the dedicated PSFCH resource region indicated by the PSFCH format 1 may be different from a union of the shared PSFCH resource region and the dedicated PSFCH resource region indicated by the PSFCH format 2.

The PSFCH configuration information may be configured with PSFCH configuration information 1 and PSFCH configuration information 2, the PSFCH configuration information 1 may be used when a number of the one or more receiving terminals is less than or equal to a threshold, the PSFCH configuration information 1 and the PSFCH configuration information 2 may be used when the number of the one or more receiving terminals exceeds a threshold, and the shared PSFCH resource region and the dedicated PSFCH resource region indicated by the PSFCH configuration information 1 may be configured independently of the shared PSFCH resource region and the shared PSFCH resource region indicated by the PSFCH configuration information 2.

According to the present disclosure, a PSFCH resource region may be classified into a dedicated PSFCH resource region and a shared (or, common) PSFCH resource region. The dedicated PSFCH resource region may be used to transmit and receive a reception response for sidelink control information (SCI). The shared PSFCH resource region may be used to transmit and receive a hybrid automatic repeat request (HARQ) response for data. When the SCI is successfully received, a receiving terminal may transmit information (hereinafter referred to as an 'SCI reception indicator') indicating that the SCI has been successfully received.

When the SCI reception indicator is received from the receiving terminal, the transmitting terminal may determine that the receiving terminal has successfully received the SCI, and may identify whether the data has been received based on the HARQ response of the receiving terminal. On the other hand, when the SCI reception indicator is not received, the transmitting terminal may determine that the reception of the SCI at the receiving terminal has failed. When the SCI reception indicator is used in the NACK-only feedback scheme, a situation in which NACK is interpreted as ACK does not occur, and thus data transmission performance can be improved. That is, the performance of the communication system can be improved.

DETAILED DESCRIPTION

Figure 1:
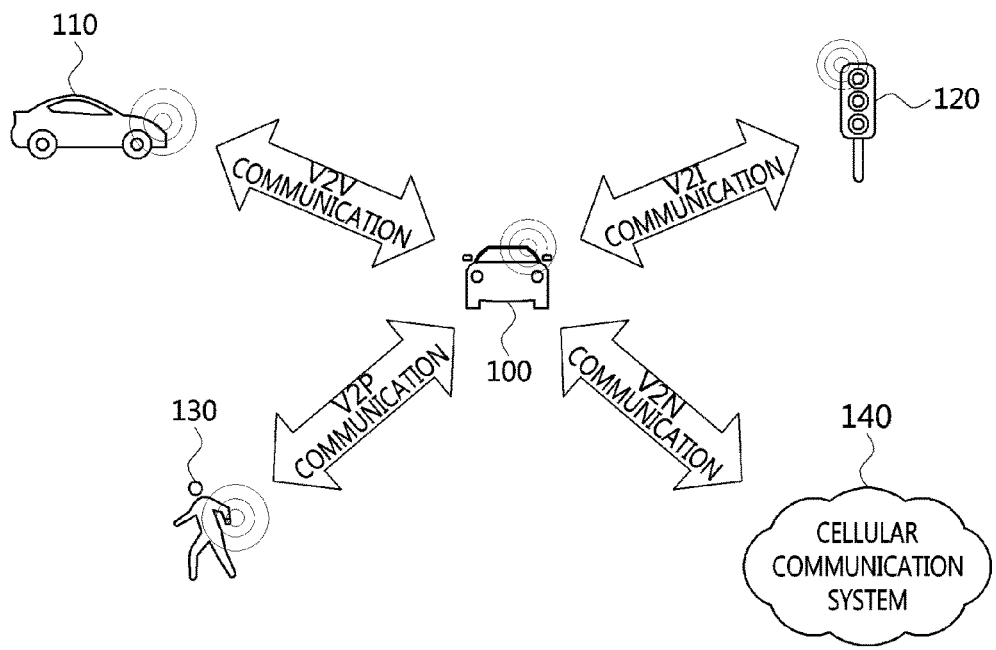
FIG. 1 is a conceptual diagram illustrating V2X communication scenarios.

While the present disclosure is susceptible to various modifications and alternative forms, specific embodiments are shown by way of example in the drawings and described in detail. It should be understood, however, that the description is not intended to limit the present disclosure to the specific embodiments, but, on the contrary, the present disclosure is to cover all modifications, equivalents, and alternatives that fall within the spirit and scope of the present disclosure.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present disclosure. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present disclosure pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present disclosure will be described in detail with reference to the accompanying drawings. In describing the present disclosure, to facilitate the entire understanding, like numbers refer to like elements throughout the description of the figures and the repetitive description thereof will be omitted.

FIG. 1 is a conceptual diagram illustrating V2X communication scenarios.

As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In this case, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In this case, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 through the V2P communications. The communication node located in the vehicle 100 or the communication node carried by the person 130 may generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). In this case, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected through the cellular communication system 140. The V2N communications may be performed based on the 4G communication technology (e.g., LTE or LTE-A) or the 5G communication technology (e.g., NR). Also, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Meanwhile, the cellular communication system 140 supporting the V2X communications may be configured as follows.

Figure 2:
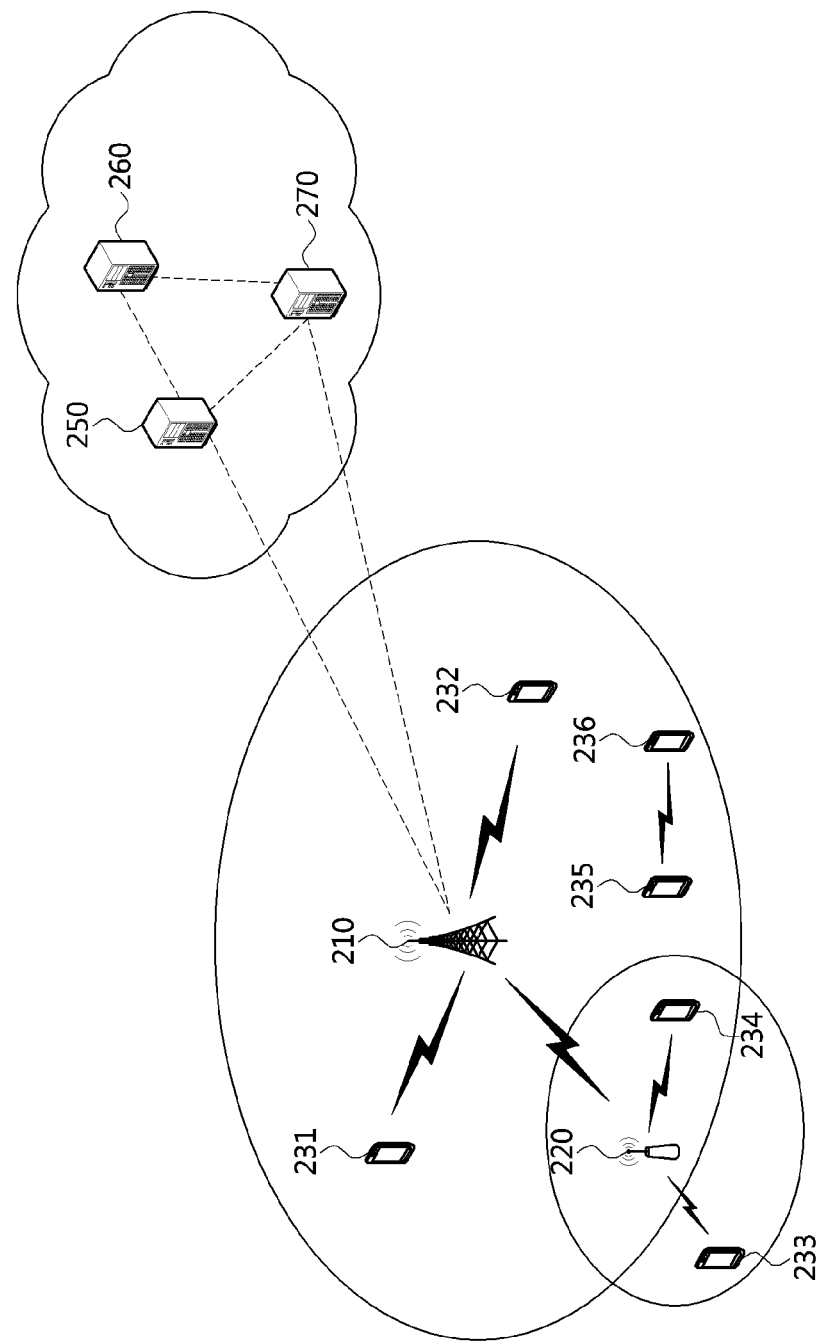
FIG. 2 is a conceptual diagram illustrating an exemplary embodiment of a cellular communication system.

FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, and the core network constituted by the UPF 250, the SMF 260, and the AMF 270 may support the 4G communication technology as well as the 5G communication technology.

In addition, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

The communication nodes (e.g., base station, relay, UE, S-GW, P-GW, MME, UPF, SMF, AMF, etc.) comprising the cellular communication system may be configured as follows.

Figure 3:
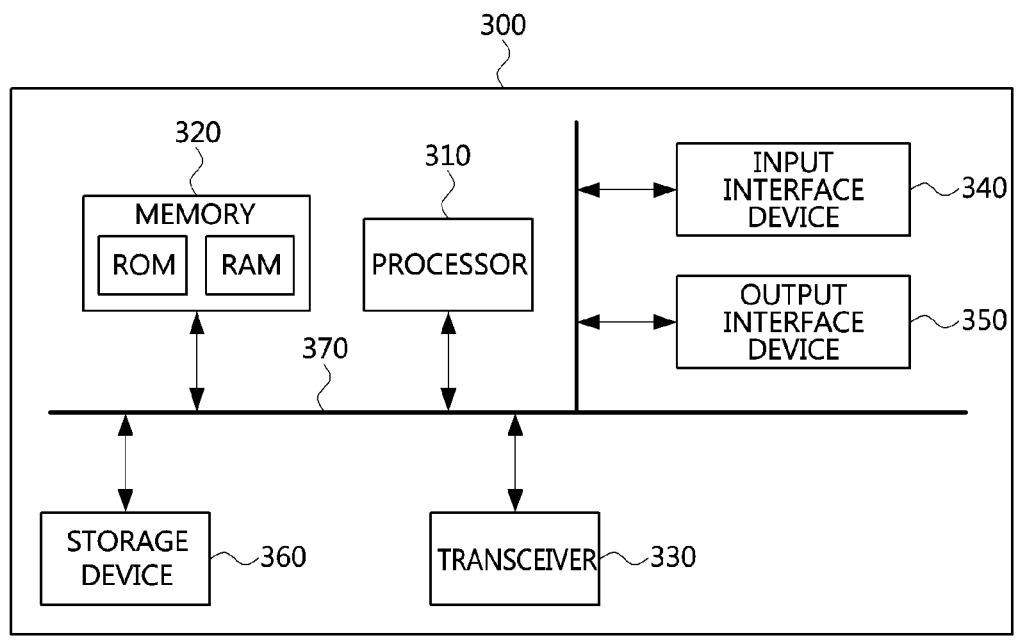
FIG. 3 is a conceptual diagram illustrating an exemplary embodiment of a communication node constituting a cellular communication system.

FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Also, the communication node 300 may further comprise an input interface device 340, an output interface device 350, a storage device 360, and the like. Each component included in the communication node 300 may communicate with each other as connected through a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed. Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may relay communications between the base station 210 and the UEs 233 and 234. That is, the relay 220 may transmit signals received from the base station 210 to the UEs 233 and 234, and may transmit signals received from the UEs 233 and 234 to the base station 210. The UE 234 may belong to both of the cell coverage of the base station 210 and the cell coverage of the relay 220, and the UE 233 may belong to the cell coverage of the relay 220. That is, the UE 233 may be located outside the cell coverage of the base station 210. The UEs 233 and 234 may be connected to the relay 220 by performing a connection establishment procedure with the relay 220. The UEs 233 and 234 may communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may perform operations corresponding to the base station 210 and operations supported by the base station 210. The UEs 233 and 234 may perform operations corresponding to the relays 220 and operations supported by the relays 220.

Here, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Meanwhile, a user plane protocol stack of the UEs (e.g., the UEs 235 and 236) performing sidelink communications may be configured as follows.

Figure 4:
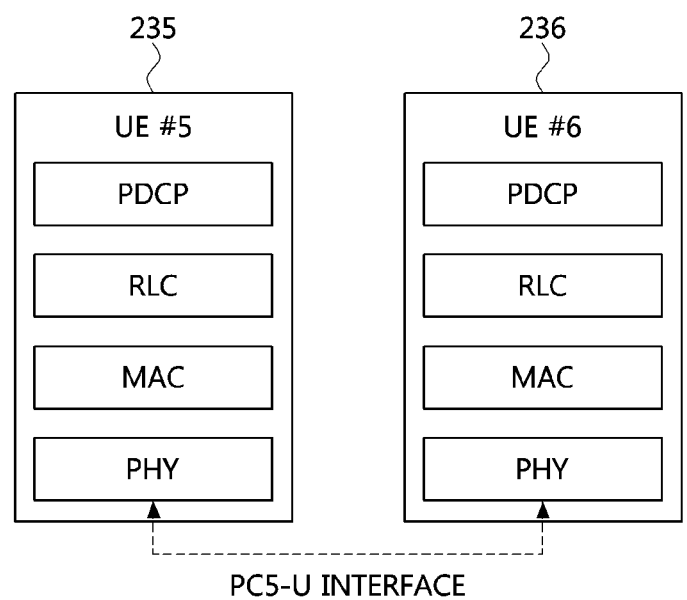
FIG. 4 is a block diagram illustrating an exemplary embodiment of a user plane protocol stack of a UE performing sidelink communication.

FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications, and the layer 2-ID may be an ID configured for the V2X communications (e.g., V2X service). Also, in the sidelink communications, a hybrid automatic repeat request (HARQ) feedback operation may be supported, and an RLC acknowledged mode (RLC AM) or an RLC unacknowledged mode (RLC UM) may be supported.

Meanwhile, a control plane protocol stack of the UEs (e.g., the UEs 235 and 236) performing sidelink communications may be configured as follows.

Figure 5:
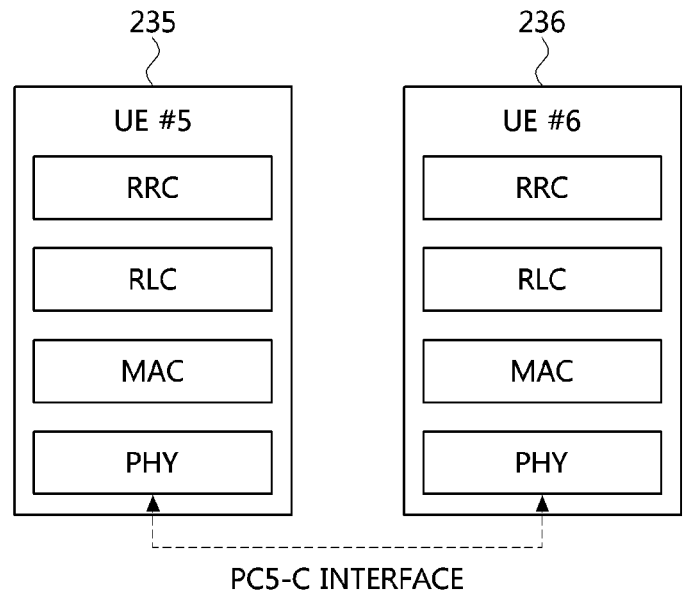
FIG. 5 is a block diagram illustrating a first exemplary embodiment of a control plane protocol stack of a UE performing sidelink communication.
Figure 6:
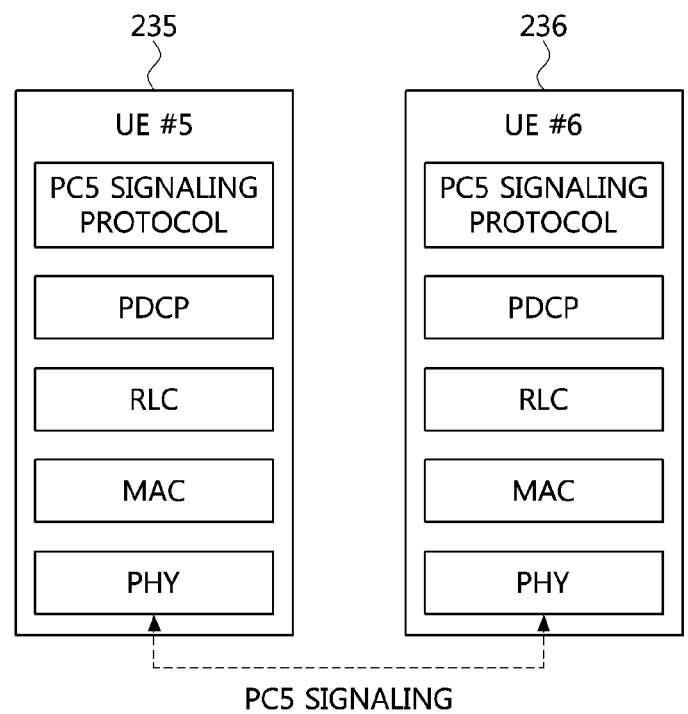
FIG. 6 is a block diagram illustrating a second exemplary embodiment of a control plane protocol stack of a UE performing sidelink communication.

FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Also, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
|---|---|
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In this case, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. In this case, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In this case, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In this case, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for transmitting and receiving HARQ responses in sidelink communication will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may perform an operation corresponding to the operation of the UE #2. In exemplary embodiments described below, an operation of a vehicle may be an operation of a communication node located in the vehicle.

In exemplary embodiments, a HARQ response may indicate acknowledgment (ACK), negative ACK (NACK), and/or discontinuous transmission (DTX). The exemplary embodiment applied to the case where a HARQ response indicates ACK may also be applied to the case where a HARQ response indicates NACK or DTX. The exemplary embodiment applied to the case where a HARQ response indicates NACK may also be applied to the case where a HARQ response indicates ACK or DTX. The exemplary embodiment applied to the case where a HARQ response indicates DTX may also be applied to the case where a HARQ response indicates ACK or NACK.

In exemplary embodiments, signaling may be one or a combination of two or more of higher layer signaling, MAC signaling, and physical (PHY) signaling. A message used for higher layer signaling may be referred to as a 'higher layer message' or 'higher layer signaling message'. A message used for MAC signaling may be referred to as a 'MAC message' or 'MAC signaling message'. A message used for PHY signaling may be referred to as a 'PHY message' or 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), or SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

In sidelink communication (e.g., sidelink communication for V2X communication), a HARQ feedback operation may be supported. A HARQ feedback operation for sidelink-groupcast communication may be performed in two schemes. The sidelink-groupcast communication may mean sidelink communication performed in a groupcast scheme. In the first scheme, all receiving terminals participating in sidelink-groupcast communication (e.g., terminals receiving sidelink data) may share a PSFCH resource region (e.g., PSFCH resource pool), and may transmit only NACK to a transmitting terminal (e.g., terminal transmitting the sidelink data) by using the PSFCH resource region.

In this case, the receiving terminal may not transmit ACK to the transmitting terminal when the sidelink data has been successfully received, and may transmit NACK to the transmitting terminal when the reception of the sidelink data has failed. This scheme may be referred to as a 'NACK-only feedback scheme'. In exemplary embodiments, "data, information, and/or signal is successfully received" may mean that "decoding of the data, information, and/or signal is successful". "reception of data, information, and/or signal fails" may mean "decoding of the data, information, and/or signal fails".

In the second scheme, a PSFCH resource region may be independently allocated (e.g., configured) to each of the receiving terminals, and each receiving terminal may transmit a HARQ response (e.g., ACK, NACK, or DTX) to the transmitting terminal by using the allocated PSFCH resource region (e.g., dedicated PSFCH resource region). In addition, for transmission of HARQ responses, a combination of the first and second scheme described above may be used. Here, a PSFCH may be in form of a sequence.

On the other hand, when the NACK-only feedback scheme is used, the transmitting terminal may erroneously recognize a reception state of the sidelink data in the receiving terminal. For example, when decoding of SCI (e.g., PSCCH) fails in the receiving terminal, the receiving terminal may not be able to transmit a HARQ response (e.g., NACK) for sidelink data (e.g., PSSCH) scheduled by the SCI. This situation may be referred to as a 'DTX' or 'DTX situation'. In this case, since the HARQ response (e.g., NACK) for the sidelink data is not received from the receiving terminal, the transmitting terminal may determine that the sidelink data has been successfully received at the receiving terminal. Methods for solving such the problem may be required.

Figure 7:
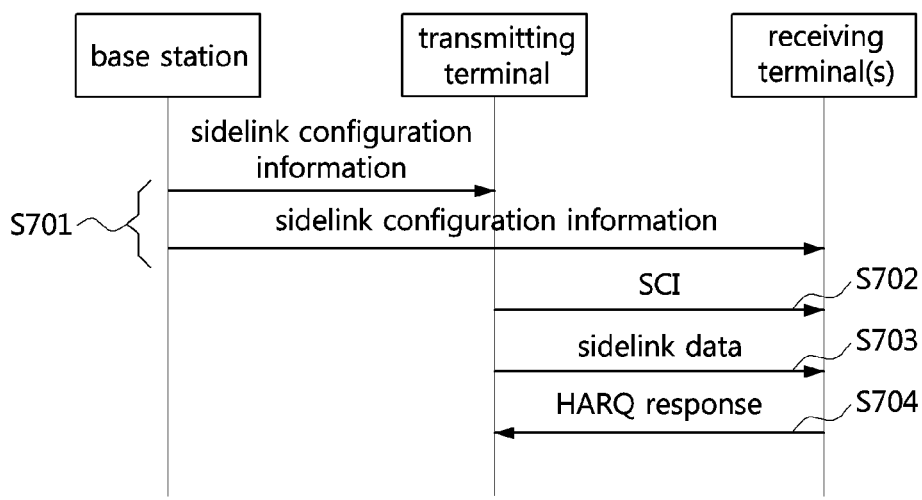
FIG. 7 is a sequence chart illustrating a first exemplary embodiment of a method for transmitting and receiving HARQ responses in a communication system supporting sidelink communication.

FIG. 7 is a sequence chart illustrating a first exemplary embodiment of a method for transmitting and receiving HARQ responses in a communication system supporting sidelink communication.

As shown in FIG. 7, a communication system may include a base station, a transmitting terminal, and receiving terminal(s). The transmitting terminal may be a terminal transmitting sidelink data (e.g., PSSCH), and the receiving terminal(s) may be a terminal receiving the sidelink data. The base station may be the base station 210 shown in FIG. 2. The transmitting terminal may be the UE 235 shown in FIG. 2, and the receiving terminal(s) may be the UE 236 shown in FIG. 2. Alternatively, the transmitting terminal may be the UE 236 shown in FIG. 2, and the receiving terminal(s) may be the UE 235 shown in FIG. 2. Each of the transmitting terminal and the receiving terminal(s) may be located in a corresponding vehicle. The base station, transmitting terminal, and receiving terminal(s) may be configured identically or similarly to the communication node 300 shown in FIG. 3. The transmitting terminal and receiving terminal(s) may support the protocol stacks shown in FIGS. 4 to 6. The transmitting terminal and receiving terminal(s) may be connected to the base station, and may perform sidelink communication based on scheduling of the base station. Alternatively, the transmitting terminal and receiving terminal(s) may be located outside coverage of the base station, and may perform sidelink communication without scheduling of the base station.

The base station may generate sidelink configuration information and transmit the sidelink configuration information through higher layer signaling (S701). The terminals (e.g., transmitting terminal and receiving terminal(s)) may receive the sidelink configuration information from the base station, and may perform sidelink communication based on the sidelink configuration information. Here, the transmitting terminal and the receiving terminal(s) may perform sidelink-groupcast communication.

The transmitting terminal may generate SCI including scheduling information (e.g., resource allocation information) of sidelink data (e.g., PSSCH), and may transmit the SCI to the receiving terminal(s) (S702). The SCI may include a '1st-stage SCI', or both a '1st-stage SCI' and a '2nd-stage SCI'. The SCI (e.g., 1st-stage SCI) may be transmitted on a PSCCH, and the 2nd-stage SCI may be transmitted on a PSSCH. The SCI may be a common SCI transmitted to all receiving terminals participating in sidelink-groupcast communication. Alternatively, the SCI may be a dedicated SCI transmitted to each of the receiving terminals participating in sidelink-groupcast communication.

The 1st-stage SCI may include at least one information element among priority information, frequency resource assignment information, time resource assignment information, resource reservation period information, DMRS pattern information, 2nd-stage SCI format information, beta offset indicator, the number of DMRS ports, modulation and coding scheme (MCS) information, and combinations thereof. The 2nd-stage SCI may include at least one information element among a HARQ processor identifier (ID), redundancy version (RV), source ID, destination ID, CSI request information, zone ID, communication range requirements, and combinations thereof. In addition, the SCI (e.g., 1st-stage SCI and/or 2nd-stage SCI) may further include information indicating a PSFCH resource for HARQ feedback (e.g., frequency resource assignment information, time resource assignment information) and/or information for transmitting a HARQ feedback.

The receiving terminal(s) may receive the SCI (e.g., 1st-stage SCI and/or 2nd-stage SCI) from the transmitting terminal, and may identify information elements (e.g., PSSCH resource information, PSFCH resource information, etc.) included in the SCI. The transmitting terminal may transmit sidelink data to the receiving terminal(s) on a PSSCH indicated by the SCI (S703). The receiving terminal(s) may receive the sidelink data from the transmitting terminal by performing a monitoring operation on the PSSCH.

Each of the receiving terminal(s) may transmit, to the transmitting terminal, a HARQ response to the sidelink data on a PSFCH indicated by the SCI (S704). Alternatively, the PSFCH may be configured by higher layer signaling. If decoding of the sidelink data is successful, ACK for the sidelink data may be transmitted in the step S704. If decoding of the sidelink data fails, NACK for the sidelink data may be transmitted in the step S704. Alternatively, the NACK-only feedback scheme may be used. In this case, if decoding of the sidelink data is successful, ACK for the sidelink data may not be transmitted in the step S704. If decoding of the sidelink data fails, NACK for the sidelink data may be transmitted in the step S704.

The transmitting terminal may receive the HARQ response(s) from the receiving terminal(s) by performing a monitoring operation on the PSFCH. When the HARQ response indicates ACK, the transmitting terminal may determine that the sidelink data has been successfully received at the receiving terminal(s). When the HARQ response indicates NACK, the transmitting terminal may determine that reception of the sidelink data has failed at the receiving terminal(s). Alternatively, the NACK-only feedback scheme may be used. In this case, if a HARQ response is not received, the transmitting terminal may determine that the sidelink data has been successfully received at the receiving terminal(s). If NACK is received, the transmitting terminal may determine that reception of the sidelink data at the receiving terminal(s) has failed. When it is determined that the receiving terminal(s) has failed to receive the sidelink data, the transmitting terminal may perform a retransmission procedure for the sidelink data.

Meanwhile, a PSFCH resource region may include a shared (or, common) PSFCH resource region and a dedicated PSFCH resource region. The PSFCH resource region may be configured within a resource pool and may be referred to as a PSFCH occasion. The shared PSFCH resource region may be used for transmitting and receiving NACK for sidelink data (e.g., PSSCH). Here, the NACK may be transmitted in form of a sequence or in form of data. The dedicated PSFCH resource region may be used for transmitting and receiving information (e.g., ACK) indicating whether SCI (e.g., PSCCH and/or PSSCH) for scheduling transmission of sidelink data has been received and/or information (e.g., ACK) indicating whether sidelink data has been received. For example, information indicating that the SCI has been successfully received may be transmitted on a dedicated PSFCH. Alternatively, information indicating a reception failure of the SCI may be transmitted on a dedicated PSFCH.

When sidelink-groupcast communication is performed, the shared PSFCH resource region may be shared by receiving terminal(s) participating in the sidelink-groupcast communication. In this case, each receiving terminal may transmit NACK for sidelink data by using the shared PSFCH resource region. The dedicated PSFCH resource region may include a resource allocated dedicatedly for each receiving terminal participating in the sidelink-groupcast communication. Each receiving terminal may transmit information indicating whether the SCI has been received and/or information indicating that sidelink data has been received by using the resource(s) allocated to itself within the dedicated PSFCH resource region.

The resource(s) allocated to each receiving terminal within the dedicated PSFCH resource region may be explicitly indicated by higher layer signaling, MAC signaling, and/or PHY signaling. Alternatively, the resource(s) allocated to each receiving terminal within the dedicated PSFCH resource region may be implicitly indicated by an ID (e.g., UE-specific ID, radio network temporary identifier (RNTI)) of the receiving terminal.

Figure 8:
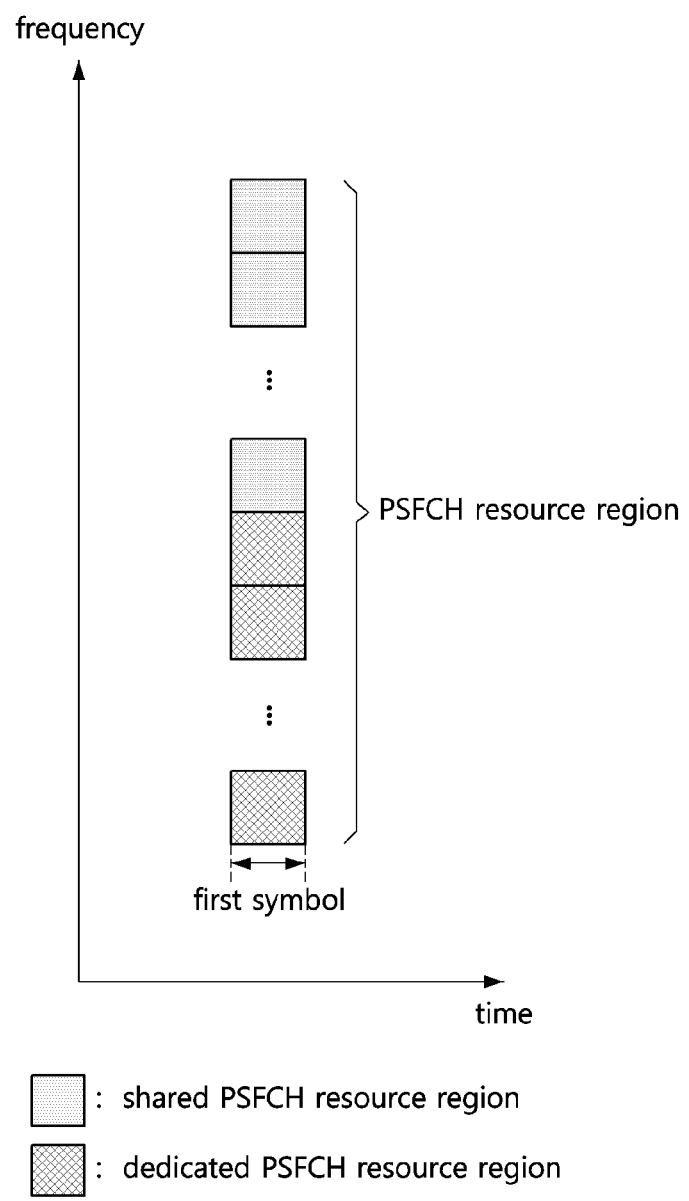
FIG. 8 is a conceptual diagram illustrating a first exemplary embodiment of a PSFCH resource region in a communication system supporting sidelink communication.
Figure 9:
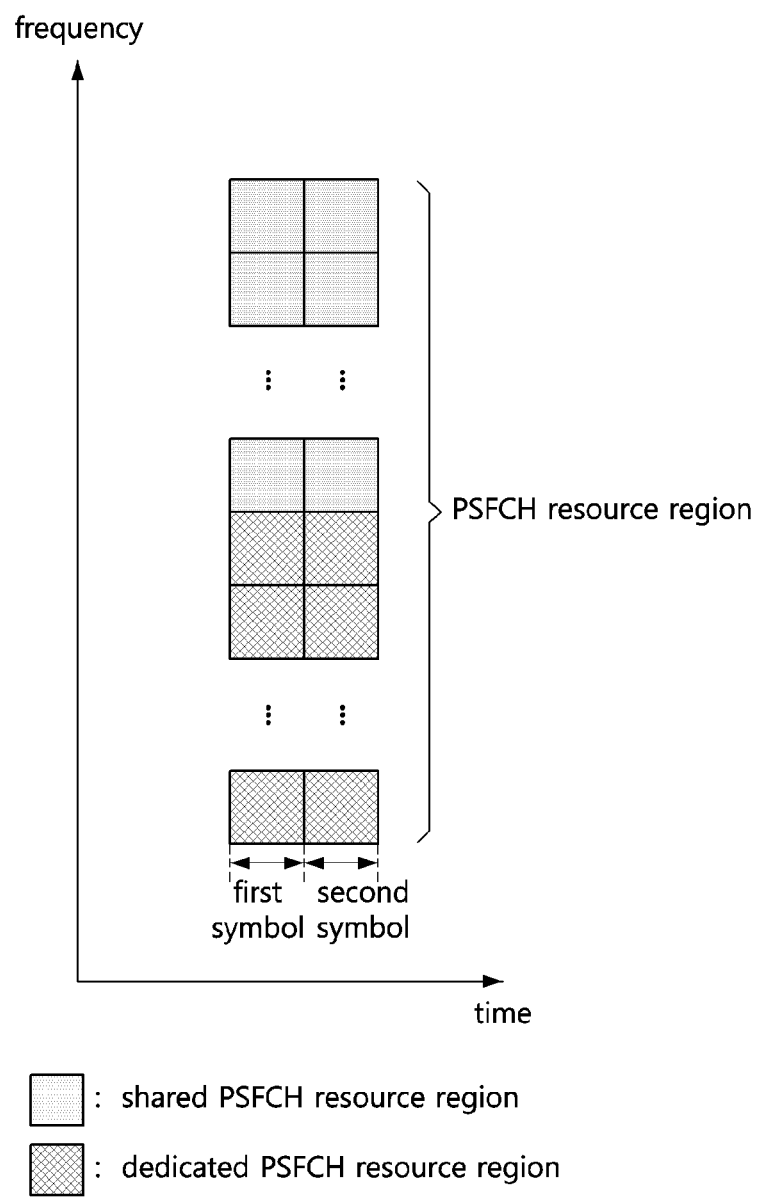
FIG. 9 is a conceptual diagram illustrating a second exemplary embodiment of a PSFCH resource region in a communication system supporting sidelink communication.
Figure 10:
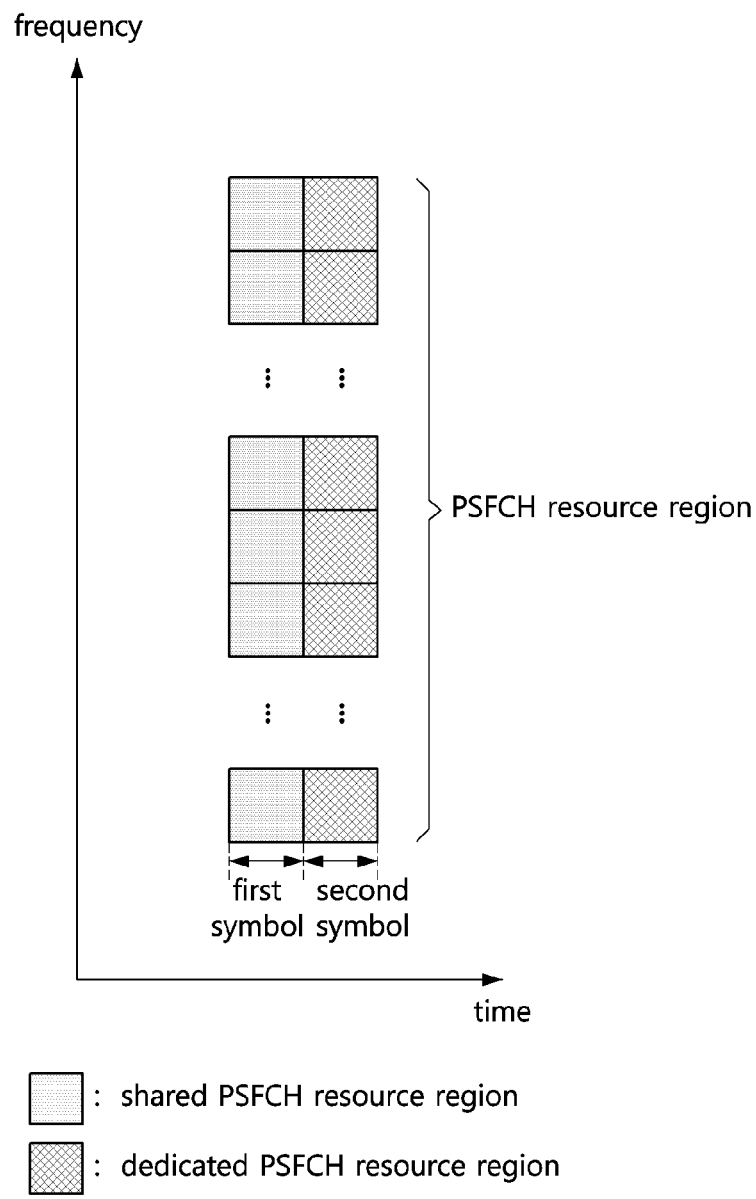
FIG. 10 is a conceptual diagram illustrating a third exemplary embodiment of a PSFCH resource region in a communication system supporting sidelink communication.

FIG. 8 is a conceptual diagram illustrating a first exemplary embodiment of a PSFCH resource region in a communication system supporting sidelink communication, FIG. 9 is a conceptual diagram illustrating a second exemplary embodiment of a PSFCH resource region in a communication system supporting sidelink communication, and FIG. 10 is a conceptual diagram illustrating a third exemplary embodiment of a PSFCH resource region in a communication system supporting sidelink communication.

As shown in FIG. 8, a PSFCH resource region may be configured with one symbol in the time domain, and may be configured with one or more resource blocks (RBs) in the frequency domain. In the frequency domain, the PSFCH resource region may be configured in units of subcarriers or RBs. A shared PSFCH resource region and a dedicated PSFCH resource region may be multiplexed in the frequency domain. In the frequency domain, the shared PSFCH resource region may be configured with one or more subcarriers or one or more RBs. The shared PSFCH resource region may be consecutive or non-consecutive in the frequency domain. In the frequency domain, the dedicated PSFCH resource region may be configured with one or more subcarriers or one or more RBs. The dedicated PSFCH resource region may be consecutive or non-consecutive in the frequency domain.

As shown in FIG. 9, a PSFCH resource region may be configured with two or more symbols (e.g., a first symbol and a second symbol) in the time domain, and may be configured with one or more RBs in the frequency domain. The first symbol may be continuous or discontinuous with the second symbol in the time domain. In the frequency domain, the PSFCH resource region may be configured in units of subcarriers or RBs. A shared PSFCH resource region and a dedicated PSFCH resource region may be multiplexed in the frequency domain. In the frequency domain, the shared PSFCH resource region may be configured with one or more subcarriers or one or more RBs. The shared PSFCH resource region may be consecutive or non-consecutive in the frequency domain. In the frequency domain, the dedicated PSFCH resource region may be configured with one or more subcarriers or one or more RBs. The dedicated PSFCH resource region may be consecutive or non-consecutive in the frequency domain.

As shown in FIG. 10, a PSFCH resource region may be configured with two or more symbols (e.g., a first symbol and a second symbol) in the time domain, and may be configured with one or more RBs in the frequency domain. The first symbol may be continuous or discontinuous with the second symbol in the time domain. In the frequency domain, the PSFCH resource region may be configured in units of subcarriers or RBs. A shared PSFCH resource region and a dedicated PSFCH resource region may be multiplexed in the time domain. For example, the shared PSFCH resource region may be located in the first symbol among two symbols, and the dedicated PSFCH resource region may be located in the second symbol among two symbols. Alternatively, the dedicated PSFCH resource region may be located in the first symbol among two symbols, and the shared PSFCH resource region may be located in the second symbol among two symbols.

In the exemplary embodiments of FIGS. 8 to 10, if the number of receiving terminal(s) participating in sidelink-groupcast communication is n, the dedicated PSFCH resource region may be divided into n sub-dedicated PSFCH resource regions. Each of the n sub-dedicated PSFCH resource regions may be configured in units of resource elements (REs). The n sub-dedicated PSFCH resource regions may be allocated to the n receiving terminal(s), respectively. That is, one sub-dedicated PSFCH resource region may be allocated to one receiving terminal. Each of the n sub-dedicated PSFCH resource regions may be configured with consecutive resources or non-consecutive resources in the frequency domain. n may be an integer of 1 or more.

One sub-dedicated PSFCH resource region may be allocated to a plurality of receiving terminals. In this case, the plurality of receiving terminals may use different orthogonal codes to transmit information indicating whether SCI has been received and/or information indicating whether sidelink data has been received in the same sub-dedicated PSFCH resource region. The orthogonal codes may be configured to the receiving terminals through higher layer signaling, MAC signaling, and/or PHY signaling. Alternatively, the orthogonal codes may be predefined in a technical specification. The above-described sub-dedicated PSFCH resource region may be configured by one or a combination of two or more schemes among a time division multiplexing (TDM) scheme, a frequency division multiplexing (FDM) scheme, and a code division multiplexing (CDM) scheme.

The shared PSFCH resource region may be arranged from a start RB or an end RB of the PSFCH resource region. Here, the RB may be a physical RB (PRB), a virtual RB (VRB), or a common RB (CRB), the start RB may be an RB having the smallest index among RBs constituting the PSFCH resource region, and the end RB may be an RB having the largest index among RBs constituting the PSFCH resource region. The dedicated PSFCH resource region may be arranged in the remaining RBs in which the shared PSFCH resource region is not arranged among the RBs constituting the PSFCH resource region. Alternatively, the dedicated PSFCH resource region may be arranged from the start RB or the end RB of the PSFCH resource region. The shared PSFCH resource region may be arranged in the remaining RBs in which the dedicated PSFCH resource region is not arranged among the RBs constituting the PSFCH resource region.

In another exemplary embodiment, the shared PSFCH resource region and the dedicated PSFCH resource region may be multiplexed within the PSFCH resource region according to the FDM scheme and the TDM scheme. For example, the shared PSFCH resource region and the dedicated PSFCH resource region may be configured according to a combination of the scheme shown in FIG. 9 and the scheme shown in FIG. 10.

Figure 11:
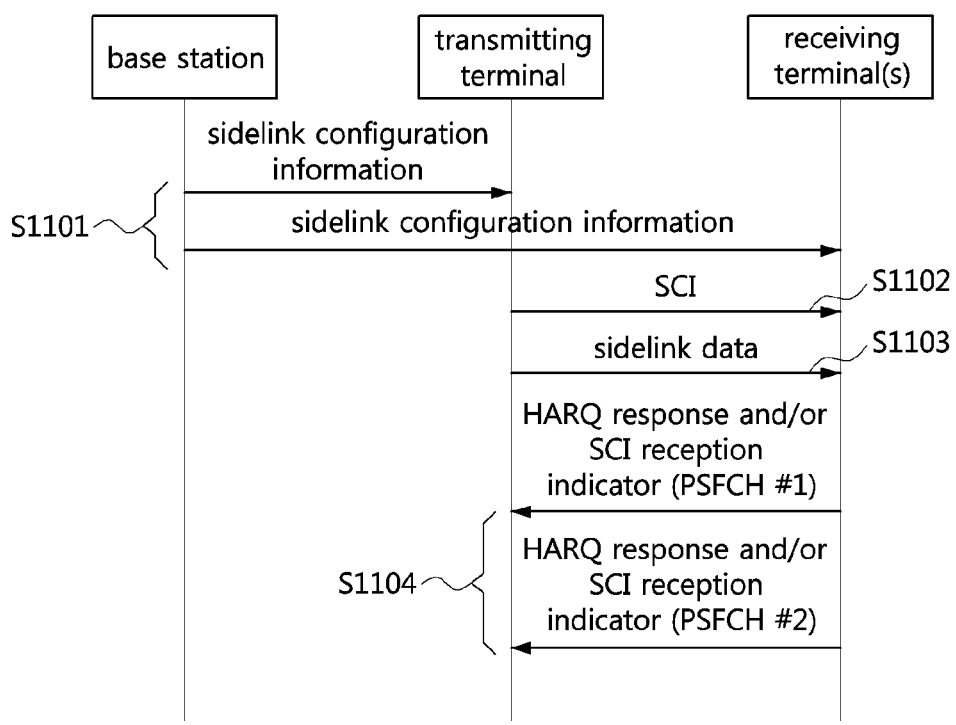
FIG. 11 is a sequence chart illustrating a second exemplary embodiment of a method for transmitting and receiving HARQ responses in a communication system supporting sidelink communication.

FIG. 11 is a sequence chart illustrating a second exemplary embodiment of a method for transmitting and receiving HARQ responses in a communication system supporting sidelink communication.

As shown in FIG. 11, a communication system may include a base station, a transmitting terminal, and receiving terminal(s). The transmitting terminal may be a terminal transmitting sidelink data (e.g., PSSCH), and the receiving terminal(s) may be a terminal receiving the sidelink data. The base station may be the base station 210 shown in FIG. 2. The transmitting terminal may be the UE 235 shown in FIG. 2, and the receiving terminal(s) may be the UE 236 shown in FIG. 2. Alternatively, the transmitting terminal may be the UE 236 shown in FIG. 2, and the receiving terminal(s) may be the UE 235 shown in FIG. 2. Each of the transmitting terminal and the receiving terminal(s) may be located in a corresponding vehicle. The base station, transmitting terminal, and receiving terminal(s) may be configured identically or similarly to the communication node 300 shown in FIG. 3. The transmitting terminal and receiving terminal(s) may support the protocol stacks shown in FIGS. 4 to 6. The transmitting terminal and receiving terminal(s) may be connected to the base station, and may perform sidelink communication based on scheduling of the base station. Alternatively, the transmitting terminal and receiving terminal(s) may be located outside coverage of the base station, and may perform sidelink communication without scheduling of the base station.

The base station may generate sidelink configuration information, and transmit the sidelink configuration information through higher layer signaling (S1101). The sidelink configuration information may include PSFCH configuration information (e.g., SL-PSFCH-Config). The PSFCH configuration information may include one or more information elements from among information elements shown in Table 3, Table 4, or Table 6 below. In another exemplary embodiment, the information element(s) described in Table 3, Table 4, or Table 6 may be transmitted through one or a combination of two or more of higher layer signaling, MAC signaling, and PHY signaling.

TABLE 3

| Information element | Description |
| --- | --- |
| sl-PSFCH-Period | sl-PSFCH-Period may indicate a period of a PSFCH resource region within a resource pool. sl-PSFCH-Period may be set in units of slots. |
| sl-PSFCH_Duration | sl-PSFCH-Duration may indicate a length of a PSFCH resource region in the time domain. sl-PSFCH-Duration may be set in units of symbols. For example, sl-PSFCH-Duration may indicate one, two, three, or four symbols. |
| sl-PSFCH-RB-Set | sl-PSFCH-RB-Set may indicate a set of PRBs (e.g., the number of PRBs included in the set of PRBs) of a PSFCH resource region used for transmitting and receiving a PSFCH. The set of PRBs may include one or more PRBs (e.g., RBs). |
| sl-Shared-PSFCH-RB-Set | sl-Shared-PSFCH-RB-Set may indicate a set of PRBs (e.g., the number of PRBs included in the set of PRBs) of a shared PSFCH resource region. The set of PRBs may include one or more PRBs (e.g., RBs). |
| sl-Dedicated-PSFCH-RB-Set | sl-Dedicated-PSFCH-RB-Set may indicate a set of PRBs (e.g., the number of PRBs included in the set of PRBs) of a dedicated PSFCH resource region. The set of PRBs may include one or more PRBs (e.g., RBs). |
| sl-PSFCH-RB-Ratio | sl-PSFCH-RB-Ratio may indicate a ratio of 'shared PSFCH resource region:dedicated PSFCH resource region' within a PSFCH resource region. For example, sl-PSFCH-RB-Ratio may indicate candidate ratios (e.g., 1:5, 2:4, 3:3, 4:2, 5:1) or a specific ratio (e.g., 1:5). |
| sl-PSFCH-RB-offset | sl-PSFCH-RB-offset may indicate an offset between a start RB of a shared PSFCH resource region and a start RB of a dedicated PSFCH resource region, or an offset between an end RB of a shared PSFCH resource region and an end RB of a dedicated PSFCH resource region. |
| sl-Shared-PSFCH-Sym | sl-Shared-PSFCH-Sym may indicate the number and/or index(es) of symbol(s) in which a shared PSFCH resource region is disposed, when the PSFCH resource region is configured with a plurality of symbols. |
| sl-Dedicated-PSFCH-Sym | sl-Dedicated-PSFCH-Sym may indicate the number and/or index(es) of symbol(s) in which a dedicated PSFCH resource region is disposed, when the PSFCH resource region is configured with a plurality of symbols. |

TABLE 4

| Information element | Description |
| --- | --- |
| sl-PSFCH-Period | sl-PSFCH-Period may indicate a period of a PSFCH resource region within a resource pool. sl-PSFCH-Period may be set in units of slots. |
| sl-PSF CH-format1 | |
| sl-PSFCH_Duration | sl-PSFCH-Duration may indicate a length of a PSFCH resource region in the time domain. sl-PSFCH-Duration may be set in units of symbols. For example, sl-PSFCH-Duration may indicate one, two, three, or four symbols. |
| sl-PSFCH-RB-Set | sl-PSFCH-RB-Set may indicate a set of PRBs (e.g., the number of PRBs included in the set of PRBs) of a PSFCH resource region used for transmitting and receiving a PSFCH. The set of PRBs may include one or more PRBs (e.g., RBs). |
| sl-PSFCH-RB-Ratio | sl-PSFCH-RB-Ratio may indicate a ratio of 'shared PSFCH resource region:dedicated PSFCH resource region' within a PSFCH resource region. For example, sl-PSFCH-RB-Ratio may indicate candidate ratios (e.g., 1:5, 2:4, 3:3, 4:2, 5:1) or a specific ratio (e.g., 1:5). |
| sl-PSF CH-format2 | |
| sl-PSFCHDuration | sl-PSFCH-Duration may indicate a length of a PSFCH resource region in the time domain. sl-PSFCH-Duration may be set in units of symbols. For example, sl-PSFCH-Duration may indicate one, two, three, or four symbols. |
| sl-PSFCH-RB-Set | sl-PSFCH-RB-Set may indicate a set of PRBs (e.g., the number of PRBs included in the set of PRBs) of a PSFCH resource region used for transmitting and receiving a PSFCH. The set of PRBs may include one or more PRBs (e.g., RBs). |

TABLE 4-continued

| Information element | Description |
| --- | --- |
| sl-PSFCH-RB-Ratio | sl-PSFCH-RB-Ratio may indicate a ratio of 'shared PSFCH resource region:dedicated PSFCH resource region' within a PSFCH resource region. For example, sl-PSFCH-RB-Ratio may indicate candidate ratios (e.g., 1:5, 2:4, 3:3, 4:2, 5:1) or a specific ratio (e.g., 1:5). |

In Table 4, a plurality of PSFCH formats (e.g., sl-PSFCH-format1, sl-PSFCH-format2) may be configured. That is, the PSFCH configuration information may be configured with a plurality of PSFCH formats. The plurality of PSFCH formats may be configured according to the number of receiving terminals participating in sidelink-groupcast communication and/or the size of the PSFCH resource region. For example, when the number of receiving terminals participating in sidelink-groupcast communication is less than or equal to a threshold (e.g., 15), sl-PSFCH-format1 may be used. When the number of receiving terminals participating in sidelink-groupcast communication exceeds a threshold (e.g., 15), sl-PSFCH-format2 may be used.

Alternatively, when the size of the PSFCH resource region (e.g., the number of RBs, the number of subcarriers, the number of symbols, the number of REs) required for sidelink-groupcast communication is less than or equal to a threshold, sl-PSFCH-format1 may be used. When the size of the PSFCH resource region (e.g., the number of RBs, the number of subcarriers, the number of symbols, the number of REs) required for sidelink-groupcast communication exceeds a threshold, sl-PSFCH-format2 may be used. For example, when the PSFCH resource region is configured with one symbol in the time domain, sl-PSFCH-format1 may be used. When the PSFCH resource region is configured with two symbols in the time domain, sl-PSFCH-format2 may be used. The size of the PSFCH resource region (e.g., shared PSFCH resource region, dedicated PSFCH resource region) indicated by sl-PSFCH-format1 may be set differently from the size of the PSFCH resource region (e.g., shared PSFCH resource region, dedicated PSFCH resource region) indicated by sl-PSFCH-format2.

Each of sl-PSFCH format1 and sl-PSFCH-format2 may include sl-PSFCH-RB-duration, sl-PSFCH-RB-Set, and/or sl-PSFCH-Ratio. The sl-PSFCH format1 may be configured independently of sl-PSFCH-format2. For example, each of sl-PSFCH-RB-duration, sl-PSFCH-RB-Set, and sl-PSFCH-RB-Ratio included in sl-PSFCH format1 may be configured independently from sl-PSFCH-RB-duration, sl-PSFCH-RB-Set, and sl-PSFCH-RB-Ratio included in sl-PSFCH-format2. In addition, sl-PSFCH-Period may be independently configured for each of sl-PSFCH-format1 and sl-PSFCH-format2.

sl-PSFCH-RB-Ratio configured by higher layer signaling may indicate candidate ratios (e.g., 1:5, 2:4, 3:3, 4:2, 5:1), and one ratio actually used among the ratios may be indicated by MAC signaling and/or PHY signaling. sl-PSFCH-RB-Ratio may be determined according to the number of receiving terminals participating in sidelink-groupcast communication. For example, sl-PSFCH-RB-Ratio may be determined based on Table 5 below. For example, when the number of receiving terminals participating in sidelink-groupcast communication is 5 or less, sl-PSFCH-fomrat1 may be used, and sl-PSFCH-RB-Ratio may be 1:5. In this case, if the PSFCH resource region includes 12 RBs, the shared PSFCH resource region may include 2 RBs, and the dedicated PSFCH resource region may include 10 RBs.

TABLE 5

| Number x of receiving terminals | x ≤ 5 | 5 < x ≤ 10 | 10 < x ≤ 15 | 15 < x ≤ 20 | 20 < x ≤ 25 | 25 < x ≤ 30 |
| --- | --- | --- | --- | --- | --- | --- |
| sl-PSFCH-format1 | 1:5 | 2:4 | 3:3 | | | |
| sl-PSFCH-format2 | | | | 1:5 | 2:4 | 3:3 |

The table information described in Table 5 may be transmitted through one or a combination of two or more of higher layer signaling, MAC signaling, and PHY signaling. Alternatively, the table information listed in Table 5 may be predefined in a technical specification.

Meanwhile, the maximum number of supportable receiving terminals through one PSFCH resource region (hereinafter, referred to as 'sl-PSFCH-maxnumUE') may be defined. When the number of receiving terminals participating in sidelink-groupcast communication is less than or equal to sl-PSFCH-maxnumUE, one PSFCH resource region may be used. When the number of receiving terminals participating in sidelink-groupcast communication exceeds sl-PSFCH-maxnumUE, a plurality of PSFCH resource regions may be used. In order to support the above-described operation, the PSFCH configuration information configured by higher layer signaling may include configuration information of a plurality of PSFCH resource regions. For example, the PSFCH configuration information may include one or more information elements among information elements shown in Table 6 below.

TABLE 6

| Information element | Description |
| --- | --- |
| sl-PSFCH-maxnumUE | sl-PSFCH-maximumUE may indicate the maximum number of receiving terminals. |
| sl-PSFCH-config1 | sl-PSFCH-config1 may include one or more information elements listed in Table 3. |
| sl-PSFCH-config2 | sl-PSFCH-config2 may be used when the number of receiving terminals participating in sidelink-groupcast communication exceeds sl-PSFCH-maximumUE. sl-PSFCH-config2 may include one or more information elements listed in Table 3. | sl-PSFCH-config1 may be PSFCH configuration information (e.g., default PSFCH configuration information) that is basically used regardless of the number of receiving terminals participating in sidelink-groupcast communication. sl-PSFCH-config2 may be PSFCH configuration information (e.g., additional PSFCH configuration information) additionally used when the number of receiving terminals participating in sidelink-groupcast communication exceeds sl-PSFCH-maxnumUE. When the number of receiving terminals participating in sidelink-groupcast communication is less than or equal to sl-PSFCH-maxnumUE, sl-PSFCH-config1 may be used. When the number of receiving terminals participating in sidelink-groupcast communication exceeds sl-PSFCH-maxnumUE, both sl-PSFCH-config1 and sl-PSFCH-config2 may be used. Information element(s) included in sl-PSFCH-config1 (e.g., information element(s) listed in Table 3) may configured independently from information element(s) included in sl-PSFCH-config2 (e.g., information element(s) listed in Table 3).

Meanwhile, the transmitting terminal and/or the receiving terminal(s) may receive the higher layer message from the base station and may identify the sidelink configuration information (e.g., PSFCH configuration information) included in the higher layer message. The PSFCH configuration information may be the PSFCH configuration information described in Table 3, Table 4, or Table 6. The transmitting terminal and/or the receiving terminal(s) may perform sidelink communication (e.g., sidelink-groupcast communication) using the sidelink configuration information.

For example, the transmitting terminal may generate SCI (e.g., 1st-stage SCI and/or 2nd-stage SCI) including scheduling information for transmission of sidelink data, and transmit the SCI to the receiving terminal(s) (S1102). The SCI may be transmitted on a PSCCH and/or PSSCH. The SCI may be a common SCI transmitted to all receiving terminals participating in sidelink-groupcast communication. Alternatively, the SCI may be a dedicated SCI transmitted to each of the receiving terminals participating in sidelink-groupcast communication. The SCI may further include PSFCH resource information for transmission of a HARQ feedback for sidelink data as well as the scheduling information. For example, when the PSFCH configuration information configured by higher layer signaling includes the information element(s) listed in Table 3, the PSFCH resource information included in the SCI includes information indicating a specific sl-PSFCH-RB-Ratio.

When the PSFCH configuration information configured by higher layer signaling includes the information element(s) listed in Table 4, the PSFCH resource information included in the SCI may include information indicating a specific sl-PSFCH-format and/or sl-PSFCH-RB-Ratio. When the PSFCH configuration information configured by higher layer signaling includes the information element(s) listed in Table 6, the PSFCH resource information included in the SCI may include information indicating whether to use sl-PSFCH-config1, information indicating whether to use sl-PSFCH-config2, and/or information indicating a specific sl-PSFCH-RB-Ratio. The resource(s) allocated to each receiving terminal within the dedicated PSFCH resource region may be explicitly indicated by a UE-specific ID (e.g., specific RNTI).

On the other hand, when the NACK-only feedback scheme is used, the HARQ feedback operation may vary for each case described in Table 7 below.

TABLE 7

| | SCI (PSCCH) | Data (PSSCH) | HARQ response | SCI reception indicator |
|---|---|---|---|---|
| Case A | Reception success | Reception success | X | Transmission |
| Case B | Reception success | Reception failure | NACK transmission | transmission |
| Case C | Reception failure | Reception failure | X | X |

[Case A]

The receiving terminal(s) may receive the SCI from the transmitting terminal by performing a PSCCH monitoring operation, and may identify information (e.g., scheduling information, PSFCH resource information) included in the SCI. The transmitting terminal may transmit sidelink data on a PSSCH indicated by the SCI (S1103). The receiving terminal(s) may detect the sidelink data by performing a PSSCH monitoring operation. When the reception of the sidelink data is successful, the receiving terminal(s) may not transmit a HARQ response (e.g., ACK) for the sidelink data to the transmitting terminal. That is, a HARQ response may not be transmitted in the shared PSFCH resource region within the PSFCH resource region. When reception of the SCI scheduling transmission of the sidelink data is successful, the receiving terminal(s) may transmit information indicating that the SCI has been successfully received (hereinafter referred to as an 'SCI reception indicator') to the transmitting terminal (S1104). Alternatively, when reception of the SCI scheduling transmission of the sidelink data is successful, the receiving terminal(s) may be configured to not transmit the SCI reception indicator. The SCI reception indicator may be an arbitrary signal or a specific sequence. The SCI reception indicator may be a signal known to all terminals (e.g., transmitting terminal and receiving terminal(s)) participating in sidelink-groupcast communication.

The SCI reception indicator may be transmitted through the dedicated PSFCH resource region within the PSFCH resource region. The dedicated PSFCH resource region may be indicated by higher layer signaling, or a combination of higher layer signaling and PHY signaling. The SCI reception indicators of the receiving terminals may be multiplexed within the dedicated PSFCH resource region based on a FDM scheme, TDM scheme, and/or CDM scheme, and the multiplexed SCI reception indicators may be transmitted through the dedicated PSFCH resource region. The SCI reception indicators may be transmitted using the same radio resource. That is, the SCI reception indicators may be transmitted according to an overlapping transmission scheme based on specific sequences. In this case, the transmitting terminal may identify each of the SCI reception indicators by using a specific sequence.

A plurality of PSFCH resource regions (e.g., PSFCH #1, PSFCH #2) may be configured based on the information element(s) described in Table 6. In addition, some receiving terminals among all receiving terminals participating in sidelink-groupcast communication may be configured to transmit HARQ responses and/or SCI reception indicators on the PSFCH #1. The remaining receiving terminals among all receiving terminals participating in the sidelink-groupcast communication may be configured to transmit HARQ responses and/or SCI reception indicators on the PSFCH #2. In this case, some receiving terminals may transmit SCI reception indicators through the dedicated PSFCH resource region within the PSFCH #1, and the remaining receiving terminals may transmit SCI reception indicators through the dedicated PSFCH resource region within the PSFCH #2.

The transmitting terminal may perform a monitoring operation on one or more PSFCH resource regions (e.g., PSFCH #1 and PSFCH #2). If a HARQ response is not received in the shared PSFCH resource region within the PSFCH resource region and an SCI reception indicator is received in the dedicated PSFCH resource region within the PSFCH resource region, the transmitting terminal may determine that the sidelink data has been successfully received at the receiving terminal(s).

[Case B]

The receiving terminal(s) may receive the SCI from the transmitting terminal by performing a PSCCH monitoring operation, and may identify information (e.g., scheduling information, PSFCH resource information) included in the SCI. The transmitting terminal may transmit sidelink data on a PSSCH indicated by the SCI (S1103). The receiving terminal(s) may detect the sidelink data by performing a PSSCH monitoring operation. When reception (e.g., decoding) of the sidelink data fails, the receiving terminal(s) may transmit a HARQ response (e.g., NACK) for the sidelink data to the transmitting terminal (S1104). In addition, when the reception of the SCI scheduling transmission of the sidelink data is successful, the receiving terminal(s) may transmit SCI reception indicator(s) to the transmitting terminal (S1104). Alternatively, when the reception of the SCI scheduling transmission of the sidelink data is successful, the receiving terminal(s) may be configured to not transmit SCI reception indicator(s). The SCI reception indicator may be an arbitrary signal or a specific sequence. The SCI reception indicator may be a signal known to all terminals (e.g., transmitting terminal and receiving terminal(s)) participating in sidelink-groupcast communication.

The HARQ response (e.g., NACK) may be transmitted through the shared PSFCH resource region within the PSFCH resource region, and the SCI reception indicator may be transmitted through the dedicated PSFCH resource region within the PSFCH resource region. Each of the shared PSFCH resource region and the dedicated PSFCH resource region may be indicated by higher layer signaling or a combination of higher layer signaling and PHY signaling. The SCI reception indicators of receiving terminals may be multiplexed in the dedicated PSFCH resource region based on a FDM scheme, TDM scheme, and/or CDM scheme, and the multiplexed SCI reception indicators may be transmitted through the dedicated PSFCH resource region. The SCI reception indicators may be transmitted using the same radio resource. That is, the SCI reception indicators may be transmitted according to an overlapping transmission scheme based on specific sequences. In this case, the transmitting terminal may identify each of the SCI reception indicators by using a specific sequence.

A plurality of PSFCH resource regions (e.g., PSFCH #1, PSFCH #2) may be configured based on the information element(s) described in Table 6. In addition, some receiving terminals among all receiving terminals participating in sidelink-groupcast communication may be configured to transmit HARQ responses and/or SCI reception indicators on the PSFCH #1. The remaining receiving terminals among all receiving terminals participating in the sidelink-groupcast communication may be configured to transmit HARQ responses and/or SCI reception indicators on the PSFCH #2. In this case, some receiving terminals may transmit HARQ responses (e.g., NACK) through the shared PSFCH resource region with the PSFCH #1, and may transmit SCI reception indicators through the dedicated PSFCH resource region within the PSFCH #1. The remaining receiving terminals may transmit HARQ responses (e.g., NACK) through the shared PSFCH resource region within the PSFCH #2, and may transmit SCI reception indicators through the dedicated PSFCH resource region within the PSFCH #2.

The transmitting terminal may perform a monitoring operation on one or more PSFCH resource regions (e.g., PSFCH #1 and PSFCH #2). When a HARQ response (e.g., NACK) is received in the shared PSFCH resource region within the PSFCH resource region and an SCI reception indicator is received in the dedicated PSFCH resource region within the PSFCH resource region, the transmitting terminal may determine that although the SCI has been successfully received at the receiving terminal(s), decoding of the sidelink data has failed. In this case, the transmitting terminal may perform a retransmission procedure of the sidelink data.

[Case C]

The receiving terminal(s) may perform a PSCCH monitoring operation. Reception of the SCI at the receiving terminal(s) may fail. In this case, since the receiving terminal cannot identify scheduling information of sidelink data included in the SCI, it may not be able to obtain the sidelink data from the transmitting terminal. In this case, the receiving terminal(s) may not be able to transmit both a HARQ response (e.g., NACK) and an SCI reception indicator to the transmitting terminal. Accordingly, the transmitting terminal may not receive both the HARQ response and the SCI reception indicator from the receiving terminal(s) in the PSFCH resource region. In this case, the transmitting terminal may determine that reception of the SCI and sidelink data has failed at the receiving terminal(s), and may perform a retransmission procedure of the sidelink data. Alternatively, when the reception of the SCI fails, the receiving terminal(s) may be configured to transmit an SCI reception indicator.

RE Puncturing Method for Energy Detection

When the NACK-only feedback scheme is used, an SCI reception indicator (e.g., arbitrary signal) may be transmitted through the dedicated PSFCH resource region. The transmitting terminal may perform an energy detection operation instead of a signal detection operation in order to detect the SCI reception indicator. In this case, the transmitting terminal may measure a strength of a signal detected in REs constituting the dedicated PSFCH resource region, and may compare the measured signal strength with a threshold. In order to determine the threshold, specific RE(s) included in the dedicated PSFCH resource region may be punctured, and an energy level (e.g., threshold) may be specified.

Information on a pattern for specific RE(s) within a resource pool allocated for sidelink-groupcast communication may be transmitted to terminals (e.g., transmitting terminal, receiving terminal(s)) through higher layer signaling. The above-described pattern information may be included in the higher layer message used for transmission of resource pool configuration information (e.g., PSFCH configuration information). Alternatively, the above-described pattern information may be transmitted using an independent higher layer message. A configuration table for various RE patterns to be punctured may be defined. When the sidelink TM 1 or 3 is used, the configuration table may be transmitted through DCI.

Resource Allocation Method for a Retransmission Procedure

When the NACK-only feedback scheme is used, the transmitting terminal may not receive NACK (or, signal corresponding to NACK) from the receiving terminal(s) in the shared PSFCH resource region. In this case, when SCI reception indicators are received from all receiving terminals in the dedicated PSFCH resource region, the transmitting terminal may not perform a retransmission procedure of sidelink data.

Alternatively, when NACK (or, signal corresponding to NACK) is not received from the receiving terminals in the shared PSFCH resource region, and SCI reception indicator(s) are not received from some receiving terminals in the dedicated PSFCH resource region, the transmitting terminal may determine that the reception of the SCI has failed at some receiving terminals (e.g., receiving terminals that have not transmitted the SCI reception indicators). Accordingly, the transmitting terminal may perform a retransmission procedure for sidelink data. In this case, the transmitting terminal may select a PSFCH format (e.g., sl-PSFCH-format 1, sl-PSFCH-format2) described in Table 4 based on the number of receiving terminals that are targets of retransmission of the sidelink data, and may transmit SCI including information on the selected PSFCH format on a PSCCH and/or PSSCH.

Here, the SCI may include scheduling information for retransmission of the sidelink data as well as the information on the PSFCH format. The receiving terminal(s) may receive the SCI from the transmitting terminal, and may identify the information (e.g., scheduling information, PSFCH format information) included in the SCI. The receiving terminal(s) may perform a monitoring operation on a PSSCH indicated by the SCI to obtain the sidelink data (e.g., retransmission sidelink data). The receiving terminal(s) may transmit HARQ response(s) according to the PSFCH format indicated by the SCI based on a result of receiving the sidelink data. In addition, the receiving terminal(s) may transmit the SCI reception indicator(s) according to the PSFCH format indicated by the SCI based on a result of receiving the SCI.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a transmitting terminal in a communication system, the operation method comprising:
receiving, from a base station, a higher layer signaling message including first physical sidelink feedback channel (PSFCH) configuration information indicating a first PSFCH resource region used for transmission or reception of a reception response for sidelink control information (SCI) and second PSFCH configuration information indicating a second PSFCH resource region used for transmission or reception of a hybrid automatic repeat request (HARQ) response for data;
transmitting, to one or more receiving terminals, the SCI including resource allocation information of the data;
transmitting, to the one or more receiving terminals, the data on a physical sidelink shared channel (PSSCH) indicated by the SCI;
performing a monitoring operation on the first PSFCH resource region indicated by the first PSFCH configuration information to receive the reception response for the SCI from the one or more receiving terminals; and
performing a monitoring operation on the second PSFCH resource region indicated by the second PSFCH configuration information to receive the HARQ response for the data from the one or more receiving terminals.

2. The operation method according to claim 1, wherein the first PSFCH resource region and the second PSFCH resource region are arranged in a same symbol, and the first PSFCH resource region is multiplexed with the second PSFCH resource region in frequency domain.

3. The operation method according to claim 1, wherein the first PSFCH resource region and the second PSFCH resource region are arranged in same frequency resources, and the first PSFCH resource region is multiplexed with the second PSFCH resource region in time domain.

4. The operation method according to claim 1, wherein information indicating a ratio between a size of the second PSFCH resource region and a size of the first PSFCH resource region is received from the base station.

5. The operation method according to claim 1, wherein the SCI further includes information indicating the first PSFCH resource region and the second PSFCH resource region, and the first PSFCH resource region and the second PSFCH resource region are configured within a resource range.

6. The operation method according to claim 1, wherein when the reception response indicates that the SCI has been successfully received, and the HARQ response is not received in the second PSFCH resource region, it is determined that the data has been successfully received by the one or more receiving terminals.

7. The operation method according to claim 1, wherein when the reception response is not received, it is determined that reception of the SCI has failed in the one or more reception terminals.

8. An operation method of a receiving terminal in a communication system, the operation method comprising:
receiving, from a base station, a higher layer signaling message including first physical sidelink feedback channel (PSFCH) configuration information indicating a first PSFCH resource region used for transmission or reception of a reception response for sidelink control information (SCI) and second PSFCH configuration information indicating a second PSFCH resource region used for transmission or reception of a hybrid automatic repeat request (HARQ) response for data;
obtaining, from a transmitting terminal, the SCI including resource allocation information of the data;
transmitting the reception response for the SCI to the transmitting terminal through the first PSFCH resource region indicated by the first PSFCH configuration information; and performing a monitoring operation on a physical sidelink shared channel (PSSCH) indicated by the SCI to obtain the data from the transmitting terminal.

9. The operation method according to claim 8, further comprising, when reception of the data fails, transmitting a negative acknowledgment (NACK) for the data to the transmitting terminal through the second PSFCH resource region indicated by the second PSFCH configuration information, wherein the second PSFCH resource region is configured independently of the first PSFCH resource region.

10. The operation method according to claim 8, wherein when the first PSFCH resource region and the second PSFCH resource region are arranged in a same symbol, the first PSFCH resource region is multiplexed with the second PSFCH resource region in frequency domain, and when the first PSFCH resource region and the second PSFCH resource region are arranged in same frequency resources, the first PSFCH resource region is multiplexed with the second PSFCH resource region in time domain.

11. The operation method according to claim 8, wherein information indicating a ratio between a size of the second PSFCH resource region and a size of the first PSFCH resource region is received from the base station.

12. The operation method according to claim 8, wherein the SCI further includes information indicating the first PSFCH resource region and the second PSFCH resource region, and the first PSFCH resource region and the second PSFCH resource region are configured within a resource range.

13. An operation method of a base station in a communication system, the operation method comprising:
configuring a first physical sidelink feedback channel (PSFCH) resource region used for transmission and reception of a reception response for sidelink control information (SCI);
configuring a second PSFCH resource region used for transmission and reception of a hybrid automatic repeat request (HARQ) response for data; and
transmitting a higher layer signaling message including PSFCH configuration information including configuration information of the first PSFCH resource region and configuration information of the second PSFCH resource region.

14. The operation method according to claim 13, wherein when the first PSFCH resource region and the second PSFCH resource region are arranged in a same symbol, the first PSFCH resource region is multiplexed with the second PSFCH resource region in frequency domain, and when the first PSFCH resource region and the second PSFCH resource region are arranged in same frequency resources, the first PSFCH resource region is multiplexed with the second PSFCH resource region in time domain.

15. The operation method according to claim 13, wherein the PSFCH configuration information is configured with a PSFCH format 1 and a PSFCH format 2, the PSFCH format 1 or the PSFCH format 2 is used according to a number of the one or more receiving terminals, and a union of the second PSFCH resource region and the first PSFCH resource region indicated by the PSFCH format 1 is different from a union of the second PSFCH resource region and the first PSFCH resource region indicated by the PSFCH format 2.

16. The operation method according to claim 13, wherein the PSFCH configuration information is configured with PSFCH configuration information 1 and PSFCH configuration information 2, the PSFCH configuration information 1 is used when a number of the one or more receiving terminals is less than or equal to a threshold, the PSFCH configuration information 1 and the PSFCH configuration information 2 are used when the number of the one or more receiving terminals exceeds a threshold, and the second PSFCH resource region and the first PSFCH resource region indicated by the PSFCH configuration information 1 are configured independently of the second PSFCH resource region and the second PSFCH resource region indicated by the PSFCH configuration information 2.

* * * * *